(12) United States Patent
Griffith et al.

(10) Patent No.: US 11,702,089 B2
(45) Date of Patent: Jul. 18, 2023

(54) MULTI-SENSOR SEQUENTIAL CALIBRATION SYSTEM

(71) Applicant: TUSIMPLE, INC., San Diego, CA (US)

(72) Inventors: Shane David Griffith, San Diego, CA (US); Chenghao Gong, San Diego, CA (US); Chenzhe Qian, San Diego, CA (US)

(73) Assignee: TUSIMPLE, INC., San Diego, CA (US)

( * ) Notice: Subject to any disclaimer, the term of this patent is extended or adjusted under 35 U.S.C. 154(b) by 184 days.

(21) Appl. No.: 17/150,271

(22) Filed: Jan. 15, 2021

(65) Prior Publication Data

US 2022/0227380 A1   Jul. 21, 2022

(51) Int. Cl.
  *B60W 50/06*  (2006.01)
  *G01S 19/42*  (2010.01)
  (Continued)

(52) U.S. Cl.
  CPC .......... *B60W 50/06* (2013.01); *B60W 60/001* (2020.02); *G01S 19/42* (2013.01);
  (Continued)

(58) Field of Classification Search
  CPC .............. B60W 50/06; B60W 60/001; B60W 2552/53; B60W 2420/42; G06T 7/85; G06T 2207/30256; G06V 20/588; G01S 19/42
  (Continued)

(56) References Cited

U.S. PATENT DOCUMENTS

| | | | |
|---|---|---|---|
| 7,840,352 B2 * | 11/2010 | Strelow | G05D 1/027 701/523 |
| 2010/0164807 A1 * | 7/2010 | Tseng | G01C 21/165 342/385 |

(Continued)

FOREIGN PATENT DOCUMENTS

| | | | | |
|---|---|---|---|---|
| CN | 112180362 | * | 1/2021 | |
| EP | 3671643 A1 | * | 6/2020 | G01B 11/26 |

OTHER PUBLICATIONS

Richard Hartley, An Investigation of the Essential Matrix, 2001 (Year: 2001).*

(Continued)

*Primary Examiner* — Elaine Gort
*Assistant Examiner* — Matthias S Weisfeld
(74) *Attorney, Agent, or Firm* — Paul Liu; Julie J. Muyco; Perkins Coie, LLP (57) ABSTRACT

Techniques for performing a sensor calibration using sequential data is disclosed. An example method includes receiving, from a first camera located on a vehicle, a first image comprising at least a portion of a road comprising lane markers, where the first image is obtained by the camera at a first time; obtaining a calculated value of a position of an inertial measurement (IM) device at the first time; obtaining an optimized first extrinsic matrix of the first camera by adjusting a function of a first actual pixel location of a location of a lane marker in the first image and an expected pixel location of the location of the lane marker;

(Continued)

and performing autonomous operation of the vehicle using the optimized first extrinsic matrix of the first camera when the vehicle is operated on another road or at another time.

20 Claims, 6 Drawing Sheets

(51) Int. Cl.
    *G06T 7/80*     (2017.01)
    *B60W 60/00*     (2020.01)
    *G06V 20/56*     (2022.01)

(52) U.S. Cl.
    CPC ............. *G06T 7/85* (2017.01); *G06V 20/588* (2022.01); *B60W 2420/42* (2013.01); *B60W 2552/53* (2020.02); *G06T 2207/30256* (2013.01)

(58) Field of Classification Search
    USPC .......................................................... 701/23
    See application file for complete search history.

(56) References Cited

U.S. PATENT DOCUMENTS

| | | |
|---|---|---|
| 2010/0235129 A1 | 9/2010 | Sharma et al. |
| 2013/0030811 A1* | 1/2013 | Olleon .................. B60K 35/00 348/148 |
| 2014/0139674 A1* | 5/2014 | Aoki ........................ G06T 7/85 348/148 |
| 2014/0294231 A1* | 10/2014 | Datta ...................... G06T 7/292 382/103 |
| 2016/0275683 A1* | 9/2016 | Sakano .................. H04N 7/183 |
| 2017/0124781 A1 | 5/2017 | Douillard et al. |
| 2018/0292818 A1 | 10/2018 | Gariepy et al. |
| 2019/0012808 A1 | 1/2019 | Mou |
| 2019/0049566 A1 | 2/2019 | Adams et al. |
| 2019/0063945 A1 | 2/2019 | Liu et al. |
| 2020/0018852 A1 | 1/2020 | Walls et al. |
| 2020/0226768 A1* | 7/2020 | Lombardi ............... G06T 7/248 |
| 2021/0383570 A1* | 12/2021 | Cai .......................... G06T 7/33 |

OTHER PUBLICATIONS

Pedro Miraldo, On the Generalized Essential Matrix Correction: An Efficient Solution to the Problem and Its Applications, Jun. 6, 2020, Journal of Mathematical Imaging and Vision (Year: 2020).*

Dellaert, F. et al., "Factor Graphs for Robot Perception," Foundations and Trends® in Robotics, 6(1-2), pp. 1-139, 2017, available at https://www.cc.gatech.edu/~dellaert/pubs/Dellaert17fnt.pdf.

"Factor Graphs and GTSAM," GTSAM, available at https://gtsam.org/tutorials/intro.html.

Forster, C. et al., "IMU Preintegration on Manifold for Efficient Visual-Inertial Maximum-a-Posteriori Estimation," available at https://smartech.gatech.edu/bitstream/handle/1853/55417/IMU%20Preintegration%20on%20Manifold%20for%20Efficient.pdf?sequence=1&isAllowed=y.

Forster, C. et al., "On-Manifold Preintegration for Real-Time Visual-Inertial Odometry," IEEE Transactions on Robotics, 2016, available at https://arxiv.org/pdf/1512.02363.pdf.

Dong, J. et al., "Motion Planning as Probabilistic Inference using Gaussian Processes and Factor Graphs," Institute for Robotics & Intelligent Machines, Robotics: Science and Systems, vol. 12, available at https://homes.cs.washington.edu/~bboots/files/GPMP2.pdf.

Mirzaei, F. et al., "A Kalman Filter-Based Algorithm for IMU-Camera Calibration: Observability Analysis and Performance Evaluation," IEEE Transactions on Robotics, 24(5), pp. 1143-1156, Oct. 2008.

Hartley, et al., "Epipolar Geometry and the Fundamental Matrix," Multiple View Geometry, Chapter 9.

Jeong, Jingyong et al. Road is Enough! Extrinsic Calibration of Non-Overlapping Stereo Camera and LiDAR Using Road Information. arxiv.org, Cornell University Library, 201 Olin Library Cornell University Ithaca, NY 14853, Feb. 27, 2019 (Feb. 27, 2019), XP081121682.

Grubl, Alexander. European Application No. 21181384.5, Extended European Search Report Mailed Nov. 25, 2021, pp. 1-8.

* cited by examiner

MULTI-SENSOR SEQUENTIAL CALIBRATION SYSTEM

TECHNICAL FIELD

This document describes techniques to perform multi-sensor calibration for sensors located in a vehicle with pre-defined and/or endurable markers.

BACKGROUND

A vehicle may include cameras attached to the vehicle for several purposes. For example, cameras may be attached to a roof of the vehicle for security purposes, for driving aid, or for facilitating autonomous driving. Cameras mounted on a vehicle can obtain images of one or more areas surrounding the vehicle. These images can be processed to obtain information about the road or about the objects surrounding the vehicle. For example, images obtained by a camera can be analyzed to determine distances of objects surrounding the autonomous vehicle so that the autonomous vehicle can be safely maneuvered around the objects.

SUMMARY

This patent document describes example multi-sensor sequential calibration techniques to calibrate multiple sensors located on or in a vehicle.

An example method of calibrating one or more sensors for an autonomous vehicle, comprises receiving, from a first camera located on a vehicle, a first image comprising at least a portion of a road comprising lane markers, where the first image is obtained by the camera at a first time; obtaining a calculated value of a position of an inertial measurement (IM) device at the first time; obtaining an optimized first extrinsic matrix of the first camera by adjusting a function of a first actual pixel location of a location of a lane marker in the first image and an expected pixel location of the location of the lane marker, where the expected pixel location is based at least on a previously known first extrinsic matrix of the first camera and the position of the IM device; and performing autonomous operation of the vehicle using the optimized first extrinsic matrix of the first camera when the vehicle is operated on another road or at another time.

In another example aspect, the above-described methods are embodied in the form of processor-executable code and stored in a non-transitory computer-readable storage medium. The non-transitory computer readable storage includes code that when executed by a processor, causes the processor to implement the methods described in the embodiments.

In yet another example embodiment, a device that is configured or operable to perform the above-described methods is disclosed.

The above and other aspects and their implementations are described in greater detail in the drawings, the descriptions, and the claims.

DETAILED DESCRIPTION

An autonomous vehicle may include sensors such as cameras, Radars, and Light Detection and Ranging (LiDAR) sensors mounted on the autonomous vehicle to obtain sensor data items (e.g., an image from camera, point cloud map from LiDAR sensor, or radar points from Radar) of one or more areas surrounding the autonomous vehicle. These sensor data items can be analyzed by a computer which may be on-board the autonomous vehicle to obtain information about the road (e.g., location of lane markers on the road) or about the objects surrounding the autonomous vehicle (e.g., distance to objects located around the autonomous vehicle). However, the sensors on the autonomous vehicle need to be calibrated so that a computer on-board the autonomous vehicle can precisely or accurately detect, for example, locations of the lane markers on the road or a location of an object in front of the autonomous vehicle.

Figure 1:
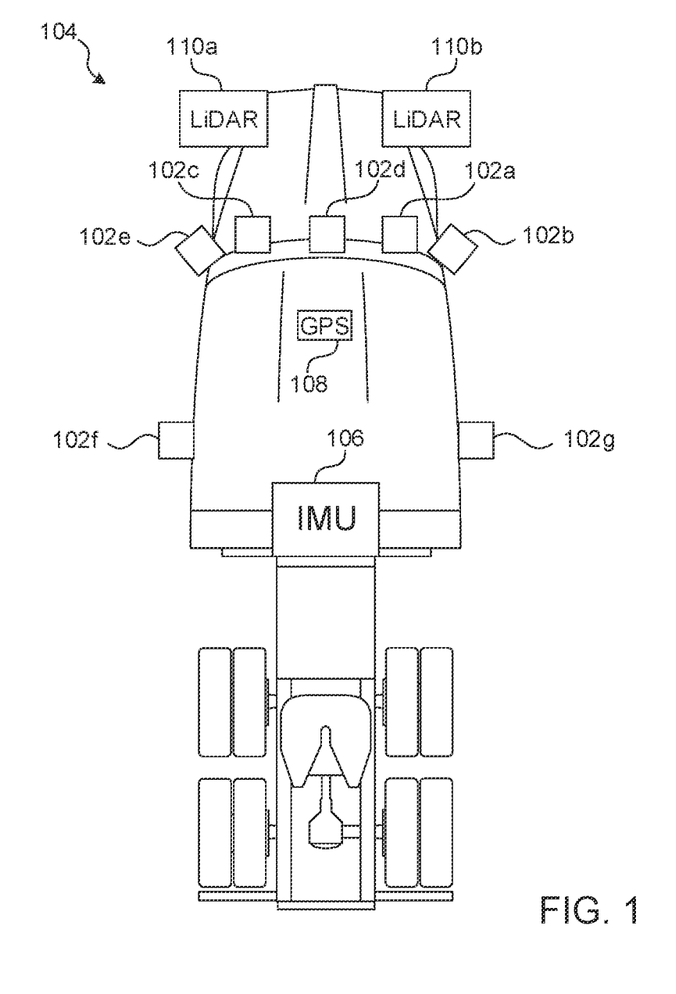
FIG. 1 shows a top view of a tractor unit of an autonomous semi-trailer truck comprising sensors for performing the example multi-sensor sequential calibration process.

FIG. 1 shows a top view of a tractor unit of an autonomous semi-trailer truck comprising sensors for performing the example multi-sensor sequential calibration process (also known as multi-sensor sequential extrinsic calibration technique). For autonomous driving, there are multiple sensors (e.g., cameras 102a-102g) mounted on the vehicle 104 at different positions with specified orientation. For example, cameras 102a, 102c, 102d may be oriented in a direction facing the front of the vehicle 104, camera 102f may be oriented in a direction facing the rear left of the vehicle 104, and camera 102g may be oriented in a direction facing the rear right of the vehicle 104. The vehicle 104 may also include LiDAR sensors 110a, 110b located in a front region of the vehicle 104. The vehicle 104 also includes an inertial measurement unit (IMU) sensor 106 in the vehicle 104. Since the IMU sensor 106 may perform best when the vehicle 104 is moving, the vehicle 104 moves through at least some part of the example multi-sensor sequential calibration process to calibrate the sensors onboard the vehicle 104 as further described in this patent document. The IMU sensor 106 may provide measurements (e.g., speed, direction, acceleration, angular velocity, etc.,) at a predetermined frequency (e.g., 40 Hz or 50 Hz).

The vehicle 104 includes a global positioning system (GPS) device 108 that provides information about a location of the vehicle 104. Since the GPS device 108 and the IMU sensor 106 are installed or located in the vehicle 104, the location of the IMU sensor 106 relative to the GPS device 108 is previously known. And, since the GPS device 108 and the multiple sensors (e.g., cameras 102a-102g) are installed or located in the vehicle 104, the location of each of the multiple sensors relative to the GPS device 108 is also previously and approximately known. Thus, a location information provided by the GPS device 108 can be used to obtain the approximate locations of the IMU sensor 106 and/or the multiple sensors on the vehicle 104. The approximate locations of the IMU sensor 106 and/or the multiple sensors (e.g., cameras 102a-102g) are provided as initial values that can be fine-tuned with the example multi-sensor sequential calibration process described herein. The GPS device 108 may provide measurements (e.g., location) at a pre-determined frequency (e.g., 5 Hz or 10 Hz). In some embodiments, the IMU sensor 106 may provide measurements at a frequency that is higher than that of the measurements provided by the GPS device 108.

The example multi-sensor sequential calibration process described herein can calibrate multiple sensors at least based on: (1) an association determined between sequential sensor data of a road obtained from the multiple sensors (e.g., at least two cameras 102a, 102d located on the vehicle 104) and previously stored map information of the road; (2) IMU sensor's 106 measurements; and (3) GPS device's 108 measurements. The use of the IMU sensor 106 can make the example multi-sensor sequential calibration process an asynchronous process at least because the sequential sensor data (e.g., images) obtained by the multiple sensors (e.g., cameras 102a-102g) may not be synchronized with the measurement data provided by the IMU sensor 106.

Figure 2:
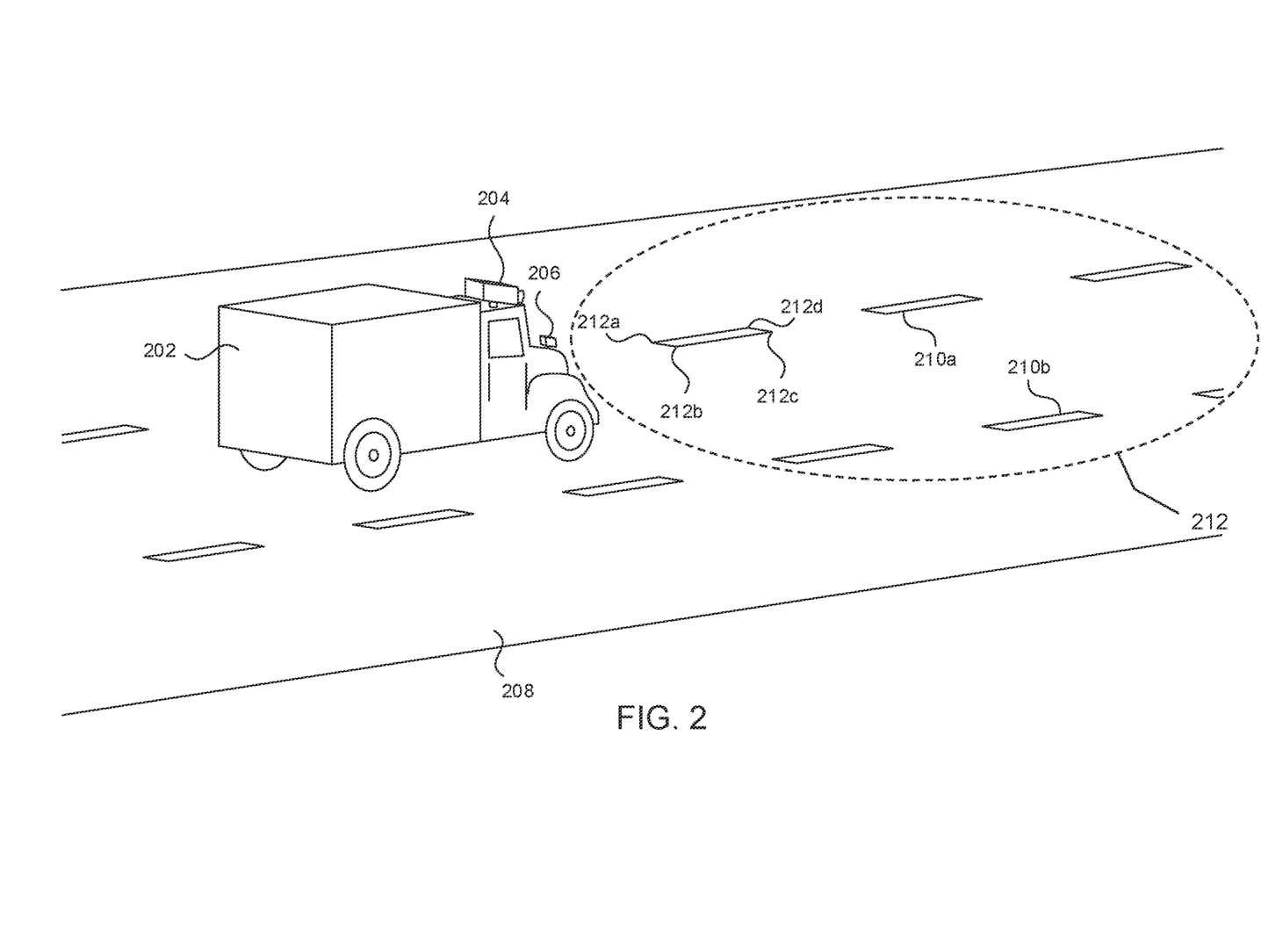
FIG. 2 shows an example scenario where a vehicle driven on a road performs the multi-sensor sequential calibration process.

FIG. 2 shows an example scenario where a vehicle driven on a road performs the multi-sensor sequential calibration process. The vehicle 202 includes multiple sensors such as a plurality of cameras and/or a plurality of LiDAR sensors. A first camera 204 and a second camera 206 is shown for ease of description. However, multiple additional camera and/or multiple LiDAR sensors can be located on or positioned on the vehicle 202 (e.g., as shown in FIG. 1 on vehicle 104) to obtain sensor data items of a calibration road segment 212 towards which the vehicle 202 can be driven. In some embodiments, the calibration road segment 212 may be located next to or behind the vehicle 202. The example multi-sensor sequential calibration process described herein for the first camera 204 and second camera 206 can be applied to other sensors (e.g., at least two cameras, at least two LiDAR sensors, at least two Radars, etc.,) that are located on the vehicle 202 and can obtain sensor data items of the calibration road segment 212. The vehicle 202 can be an autonomous vehicle.

The road 208 includes a calibration road segment 212 that has lane markers that can be affixed on either side of the road 208. The lane markers include a first set of lane blocks 210a located on a first side of the road 208, and a second set of lane blocks 210b located on a second side of the road 208 opposite to the first side. In each set of lane blocks, one lane block can be separated from another lane block by a pre-determined distance to form a set of broken lines on the road. A lane block 210a, 210b can have a rectangular shape and can have a white color. As shown in FIG. 2, the first and second set of lane blocks 210a, 210b can be parallel to each other and can extend for a length of 100 meters, 150 meters, or 200 meters to enable a computer located in the vehicle 202 to perform the multi-sensor calibration techniques described in some embodiments.

The road 208 can be straight (as shown in FIG. 2) and can have an even top surface so that the sensors located on the vehicle 202 can easily obtain sensor data items of the calibration road segment 212. In some embodiments, the road 208 with a calibration road segment 212 can be a built as a private road outside or in a facility where the vehicle 202 is parked so that when the vehicle 202 is turned on to drive to a destination, the multiple sensors on the vehicle 202 can be calibrated on the private road. In some other embodiments, the road 208 can be a public road where the calibration road segment 212 may exclude an area where broken lines are absent.

Figure 4:
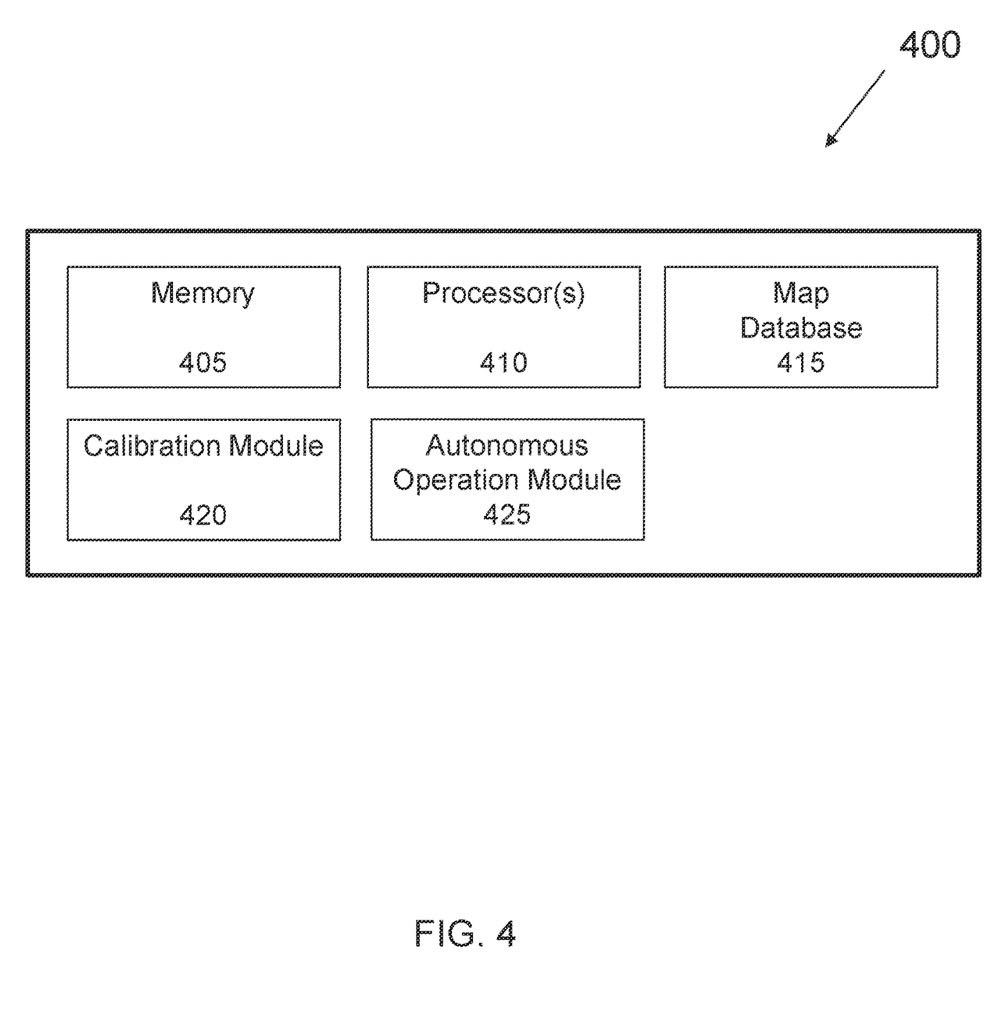
FIG. 4 shows an example block diagram of a computer that may be located in a vehicle to perform an example multi-sensor sequential calibration process.

A computer, which may be located in the vehicle 202, may store a map database (shown as 415 in FIG. 4). The map database includes the three-dimensional (3D) world coordinates of each corner 212a-212d of each lane block. The computer may include a calibration module (shown as 420 in FIG. 4) that performs operations related to the example multi-sensor sequential calibration process by using measured data from the IMU as a constraint between consecutive camera poses as the vehicle is driven between a pre-defined starting location on the road and a pre-defined ending location on the road. The calibration module can determine that the vehicle is at the pre-defined starting and ending locations by comparing the location of the vehicle (obtained by the GPS device) with the two pre-determined locations of the starting and ending locations.

The calibration module can provide an optimized estimate of a camera-IMU sensor transform, $T_c$, which describes extrinsic parameters between the camera and the IMU sensor by using Equation (1) and measurements obtained by the GPS device. The calibration module obtains a location of the vehicle at time t from the GPS device located on the vehicle. The calibration module can determine a position (also known as pose) of the multiple sensors (e.g., cameras) located on the vehicle and the IMU sensor located on the vehicle based on the location of the vehicle provided by the GPS device and previously known distances from the GPS device to the IMU sensor and the multiple sensors. For example, if the vehicle included at least one camera and an IMU sensor, the calibration module can obtain both the pose of the camera, $T_t^c$ and the pose of the IMU sensor, $X_t$ at time t. The camera-IMU sensor transform, $T_c$ can be determined by the calibration module by using Equation (1):

$$T_c = X_t \ominus T_t^c \qquad \text{Equation (1)}$$

In this patent document, the LaTeX symbols $\oplus$ and $\ominus$ denote the composition and the inverse composition operation for a Lie Group. In Equation (1), the Lie group is SE3. The compose operator for the SE3 Lie group is the composition of 6D transforms. A 6D transform includes (roll, pitch, yaw) information of the sensor (e.g., IMU sensor or camera), e.g., R that belongs to a three-dimensional coordinate space $\mathbb{R}^3$ and (x, y, z) position information of the sensor (e.g., IMU sensor or camera), e.g., T in a three-dimensional coordinate space $\mathbb{R}^3$. The composition of two transforms, $A=R^a,T^a$, $B=R^b,T^b$ in SE3 for $C=A\oplus B$ is $R^c=R^a*R^b$, and $T^c=R^aT^b+T^a$. The inverse composition reverses a composition. Equation (1) only describes IMU sensor pose $X_t$ and camera pose $T_t^c$. Although the IMU sensor pose, $X_t$, and the camera pose, $T_t^c$, change over time, the camera-IMU sensor transform, $T_c$, between them can remain consistent. The camera-IMU sensor transform, $T_c$, belongs to a SE(3) matrix, where SE(3) is a Lie group.

Figure 5:
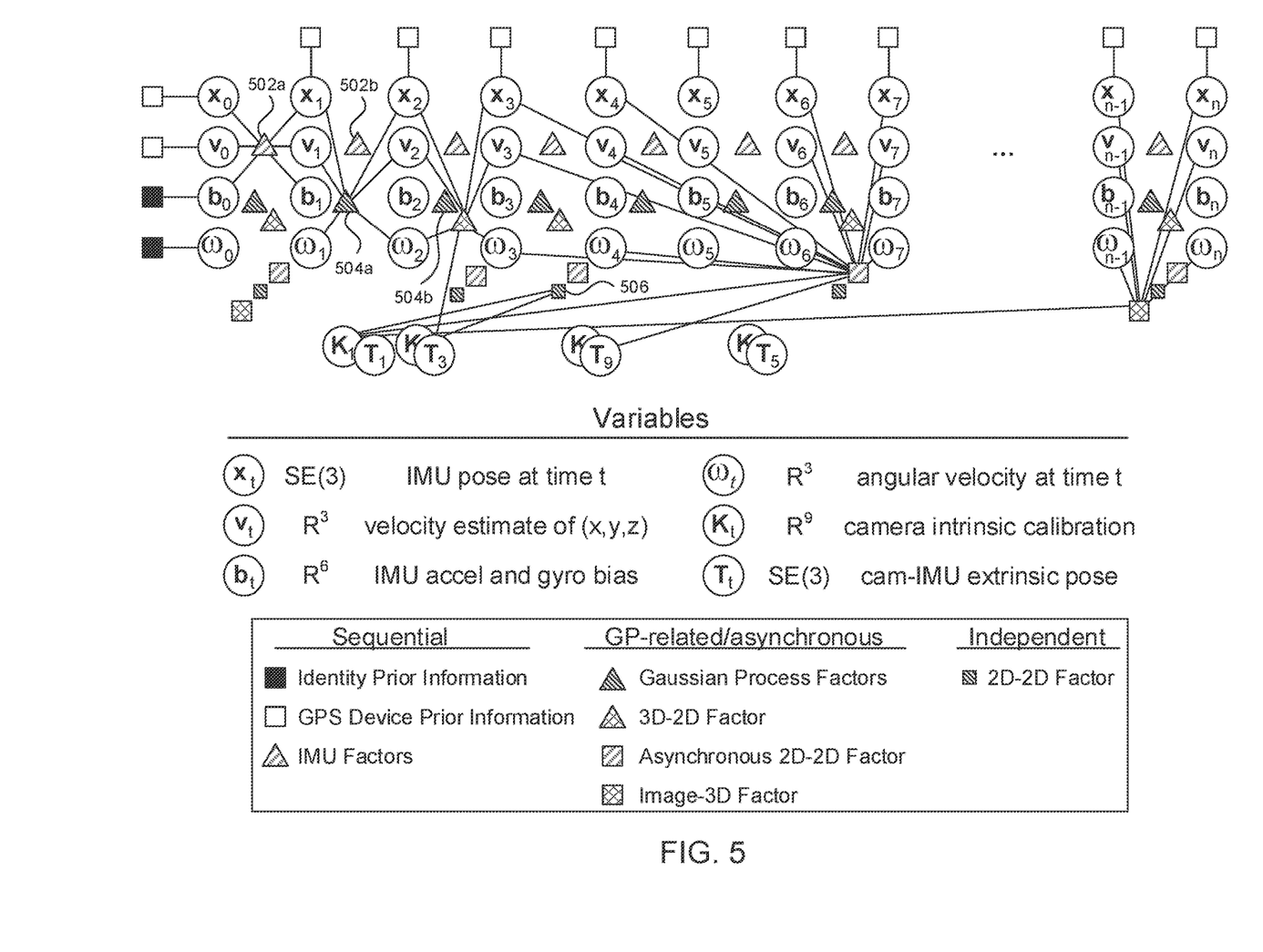
FIG. 5 shows an example factor graph representation for the multi-sensor sequential calibration process described herein.

FIG. 5 shows an example factor graph representation for the multi-sensor sequential calibration process described herein. The optimization technique in FIG. 5 is performed by the calibration module. The factor graph is a model used to represent the optimization problem. The calibration module applies optimization to the factor graph to solve the value of the variables shown in circles in FIG. 5 in order to minimize all the loss that is defined by the factors shown in squares or triangles. The columns shown in FIG. 5 (shown with subscripts 0 to n-1 and n in the circles) indicate the variables that are solved by the factor graph for times 0 to n. The section headings in this patent document are meant to facilitate an ease of understanding. Accordingly, one or more features from one section can be combined with one or more features of another section.

I. Variables of the Factor Graph

The variable $X_t$ indicates IMU sensor pose at time t, where $X_t$ belongs to a SE(3) matrix, where SE(3) is a Lie group. The calibration module can determine the IMU sensor pose $X_t$ based on location information provided by the GPS at time t and based on a previously known location of the IMU relative to the GPS device. The variable $V_t$ indicates the velocity of the vehicle at time t, where $V_t$ belongs to a three-dimensional coordinate space $\mathbb{R}^3$. The variable $B_t$ indicates an IMU accelerometer (or accel+gyro bias at time t, where $B_t$ belongs to a six-dimensional coordinate space $\mathbb{R}^3$. The variable $\omega_t$ indicates an angular velocity of the vehicle at time t, where $\omega_t$ belongs to a three-dimensional coordinate space $\mathbb{R}^3$. The variable $T_c$ is camera-IMU sensor transform or camera extrinsic parameters of a camera, where $T_c$ belongs to a SE(3) matrix. The variable $K_c$ is an intrinsic matrix of the camera, where the intrinsic matrix includes parameters that describe optical characteristics (e.g., focal length, distortion, optical center, etc.,) of the camera. The variables $T_c$ and $K_c$ can be separately determined for each of the multiple cameras located on the vehicle.

II. Information Provided for the Factor Graph

As indicated by the legend in FIG. 5, the squares located on top of the factor graph are location information provided by the GPS device to the calibration module at time 1 to time n. The top two squares located to left of the left-most column are location information provided by the GPS to the calibration module at time 0. FIG. 5 also shows that the bottom two squares located to left of the left-most column are identity prior information that are obtained by the calibration module prior to time 0. An identity prior can be a constraint for which the values, $B_0$, $\omega_0$, are zero vectors so that the identity for a $\mathbb{R}^3$ vector, $\omega_0$, can be (0,0,0), and the identity for the $\mathbb{R}^3$ vector, $B_0$, can be (0,0,0,0,0,0). The values for $B_0$ and $\omega_0$ can enable the optimization to be fully constrained.

III. IMU Factor for the Factor Graph

FIG. 5 shows an IMU factor that is obtained by the calibration module based the GPS measurements and based on IMU accelerometer and gyroscope measurements between the states at time $X_{t-1},V_{t-1},B_{t-1}$ and $X_t,V_t,B_t$. For example, as indicated by the IMU factor triangles in FIG. 5, the calibration module obtains from the GPS device measured data with which the calibration module can determine a pose $X_t$ of the IMU sensor, and the calibration module can obtain from the IMU sensor a velocity $V_t$ and a bias value $B_t$. The IMU bias, $B_t$, can also be part of the optimization. The accelerometer and the gyroscope in the IMU can be susceptible to systematic measurement error. That error consists of gaussian noise and a bias to the actual acceleration and angular velocity being measured. The bias can be slowly varying and the IMU sensor can change the bias due to changes in, for example, temperature. The bias can be solved for as part of the optimization to improve the accuracy of the constraint. The IMU sensor's accelerometer can provide acceleration $a_t$ in $\mathbb{R}^3$, and gyroscope measurements, $\omega_t$ in $\mathbb{R}^3$ at time t between two times j, k (e.g., j<=t<k) to provide a constraint on $X_j, V_j, B_j$ and $X_k, V_k, B_k$ as further described below. The calibration module obtains the measured data from the IMU sensor at a pre-determined frequency indicated by the IMU factor triangles labeled 502a, 502b, and so on as indicated in FIG. 5.

In some embodiments, the IMU acceleration measurement, $a_t$, relates to an estimate of the true acceleration, $\hat{a}_t$, according to Equation (2).

$$a_t = R_t(\hat{a}_t - g) + b(a)_t + H(a)_t \qquad \text{Equation (2)}$$

where $R_t$ describes the rotation of the device at time t, g is the 3D vector for gravity, $b(a)_t$ is the bias of the acceleration, and $H(a)_t$ is white noise. The IMU factor constrains the device rotation and the bias to be consistent with the measured acceleration.

In some embodiments, the IMU angular velocity measurement, $w_t$, relates to an estimate of the true angular velocity, $\hat{a}_t$, according to Equation (3).

$$w_t = \hat{w}_t + b(g)_t + H(g)_t \qquad \text{Equation (3)}$$

where $b(g)_t$ and $H(g)_t$ are the bias and the white noise of the gyroscope. The IMU factor constrains the gyroscope bias to match the measurement.

The IMU factor uses the estimates of the true angular velocity to constrain the device rotation according to Equation (4).

$$R_j = R_i \prod_{k=i}^{j-1} \text{Exp}(\hat{w}_t \Delta t) \qquad \text{Equation (4)}$$

where $R_i$, $R_j$ represent the orientation of the device at times i, j, Exp(.) is the exponential map function, and $\Delta t$ is the change in time. The exponential map defines a conversion from a vector in $\mathbb{R}^3$ to a $\mathbb{R}^{3\times 3}$ rotation matrix.

The IMU factor uses the estimates of the true acceleration to constrain the device velocity and position according to Equations (5)-(6).

$$v_j = v_i + g\Delta t_{i,j} + \sum_{k=i}^{j-1} \hat{a}_t \Delta t \qquad \text{Equation (5)}$$

$$p_j = p_i + \sum_{k=i}^{j-1} v_k \Delta t + \frac{1}{2} g \Delta t_{i,j}^2 + \frac{1}{2} \sum_{k=i}^{j-1} \hat{a}_i \Delta t^2 \qquad \text{Equation (6)}$$

where $v_i$, $v_j$ represent the device velocity at times i, j, and $p_i$, $p_j$, the device positions.

The IMU factor also constraints consecutive IMU bias terms to change slowly by minimizing the error according to Equation (7).

$$\|b(g)_j - b(g)_i\|_2 \text{ and } \|b(a)_j - b(a)_i\|_2 \qquad \text{Equation (7)}$$

IV. Gaussian Process Factor for the Factor Graph

Once the calibration module obtains IMU sensor measured data for at least two consecutive times (e.g., 502a, 502b), the calibration module can obtain the gaussian process factor. The calibration module obtains the gaussian factor, which can be a set of at least three values that describe the pose, velocity, and angular velocity between $X_{t-1}$, $V_{t-1}$, $\omega_{t-1}$ and $X_t, V_t, \omega_t$ so that the calibration module can obtain the gaussian factor between two states as a measurement. Thus, for example, the calibration module can obtain gaussian factor 504a (at least three values that includes a value between $X_1$ and $X_2$, a value between $V_1$ and $V_2$, and a value between $\omega_1$ and $\omega_2$), and the calibration module can obtain gaussian factor 504b, and so on as indicated in FIG. 5. One of the functions of treating the camera trajectory as a gaussian process in this way is that asynchronous camera measurements can be incorporated into the factor graph as further explained in below for the 3D-2D factor determined by the calibration module. The sensor data (e.g., images) obtained by cameras on a vehicle may not be synchronous with the measured data provided by the IMU sensor. Thus, poses, velocities, and angular velocities between states can be interpolated by the calibration module so that measurements from asynchronous images can be added to the factor graph for the 3D-2D factor.

V. 3D-2D Factor for the Factor Graph

The calibration module obtains an image from each of multiple cameras (e.g., a first camera and a second camera located on the vehicle) at time t=m where the image comprises one or more lane blocks (shown as 210a, 210b in FIG. 2). The calibration module determines a 3D-2D factor which is determined as a set of values for $T_c$, $K_c$ and a set of values (e.g., interpolated values) between $X_j$, $V_j$, $\omega_j$ and $X_k$, $V_k$, $\omega_k$, respectively, for the image captured at time t=m, where j≤m≤k. The interpolation of $X_t$ may require two sets of pose variables, velocity variables, and angular velocity variables. Thus, the interpolation of $X_t$ may include six variables in order to solve for the pose at the time t between the two states. The calibration module can determine an expected pixel locations (p") of a location (e.g., corner) of a lane block on the road using an IMU sensor pose $X_t$, that may be interpolated between $X_j$ and $X_k$) using Equation (8) for each of the multiple cameras:

$$p''=K_c X_t T_c P \quad \text{Equation (8)}$$

where $K_c$ is the intrinsic camera matrix for a camera that obtained the image, $X_t$ is IMU sensor pose, $T_c$ is the extrinsic matrix of the camera that obtained the image, and P is the 3D world coordinates of the lane block in the image, where P is the 3D world coordinates of the location (e.g., corner) of the lane block obtained by the calibration module from the map database.

The loss function for each 3D-2D factor (also known as localization factor) can be determined by subtracting the expected pixel location p" from the actual pixel location p' using a L2 Euclidian norm as shown in Equation (9):

$$\|p'-p''\|_2=0 \quad \text{Equation (9)}$$

where p' is the actual pixel location of a location (e.g., corner) of the lane block in an image in two-dimensional coordinate space. Thus, the calibration module minimizes the difference between p' and p" by adjusting the extrinsic matrix $T_c$ of the camera to obtain an optimized extrinsic matrix $T_c$ of the camera.

The multi-sensor sequential extrinsic calibration technique for the cameras can be performed by the calibration module as follows: the vehicle drives on a road (e.g., as shown in FIG. 2) collecting sensor data (e.g., camera images) along the way; the collected sensor data is uploaded to a computer (e.g., 400 in FIG. 4), which can be accessed by the calibration module. The calibration module obtains the collected sensor data and constructs the constraints of the factor graph as described herein, which represents the sequence of constraints from the sensor data captured along the calibration route. The calibration module can apply a non-linear optimization to the factor graph of constraints. The calibration module can apply non-linear optimization on the constraints obtained from the IMU, the GPS, and the results of image process to render the pose transforms, which can solves for values of the variables that minimizes the total error to all the constraints. The result is applicable to the vehicle that obtained the sensor data. The same calibration procedure can be repeated for different vehicles.

VI. 2D-2D Factor for the Factor Graph

In some embodiments, the calibration module can determine whether a 2D-2D image-to-image factor can be applied for two cameras that have at least some overlapping field of views. The identity of the two cameras having at least some overlapping field of views is previously known and may be stored in a table on the computer (e.g., 400 in FIG. 4), where the calibration module can access the stored table. For example, for the example camera setup in FIG. 1, the calibration module can apply a 2D-2D image-to-image factor to images obtained by cameras 102a and 102b, or 102c and 102d, etc., If the calibration module determines that a first image obtained by a first camera comprises a lane block that is the same as the lane block in a second image obtained from the second camera, where the calibration module determines that the first camera and the second camera are pre-determined to have overlapping field of views, then the calibration module can obtain a 2D-2D image-to-image factor 506. Each lane block may include four map points (e.g., for four corners), each of which has an identifier (ID). After the calibration module acquires the data association of 2D pixel locations and 3D world coordinates between the lane blocks in an image and the map, the calibration module uses the map point IDs to identify 2D-2D pixel pairs between two images obtained from two cameras for which a 2D-2D factor can be defined.

Figure 6:
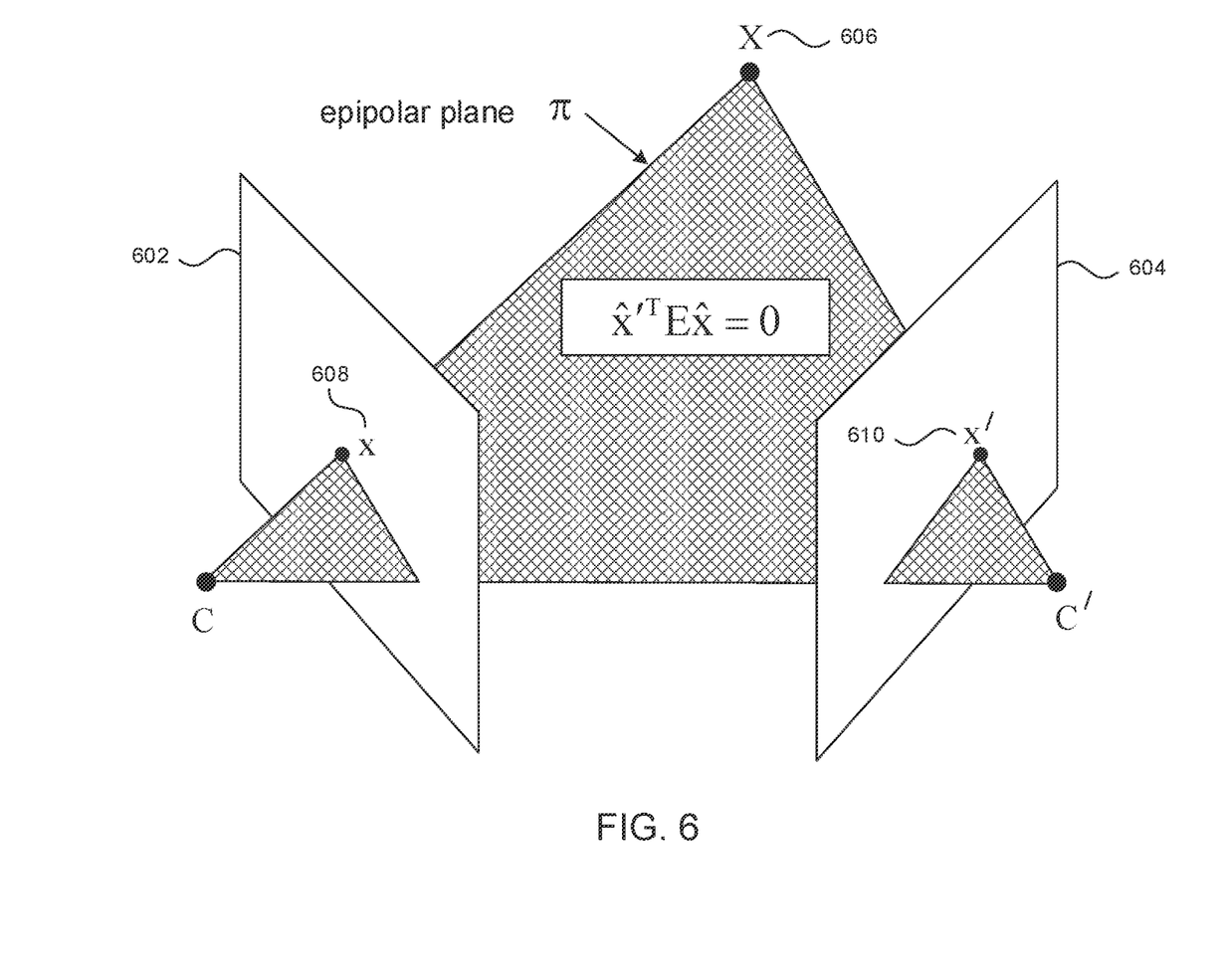
FIG. 6 shows an example of two images obtained by two cameras that are setup for Epipolar geometry.

A 2D-2D image-to-image factor describes a constraint between cameras for images captured at the same time, which can enable a 2D-2D correspondences of a same lane block in two images of the two cameras to match Epipolar geometry. FIG. 6 shows an example of two images 602, 604 obtained by two cameras that are setup for Epipolar geometry. In FIG. 6, X 606 is a location (e.g., corner) of a lane block that is captured by the two images at pixel locations x 608 and x' 610 in images 602 and 604, respectively. The calibration module can determine the Essential matrix E constraint between a pair of corresponding 2d points x 608 and x' 610 using Equations (10) to (14). The Essential matrix describes a relationship between the location of a pixel in one image and the location of another pixel in another image. The 2D-2D factor enables the pixel coordinate to lie on Epipolar lines between the two cameras. This 2D-2D factor constraint is useful at least because the map points may have some slight errors so that this constraint avoids the use of the 3D world coordinates in the map; and because the cameras can be consistent with one another even if they cannot match the map points exactly.

The calibration module applies a 2D-2D factor constraint between $T_c$, $K_c$, $p_r^c$ and $T_d$, $K_d$, $p_s^d$ using Equations (10) to (14), where $p_r^c$ is the measured pixel coordinates of a location (e.g., corner) of a lane block obtained from an image from camera_c and $p_s^d$ is the measured pixel coordinates of the same location (e.g., corner) of the same lane block obtained from an image from camera_d, where $T_c$ and $T_d$ are the camera-IMU sensor transform or the camera extrinsic parameters of camera_c and camera_d, respectively, and, where $K_c$ and $K_d$ are the intrinsic parameters of camera_c and camera_d, respectively:

$$\Delta P = T_c^{-1} \oplus T_d \quad \text{Equation (10)}$$

ΔP describes the pose transform in SE3 between the two cameras at poses $T_c$ and $T_d$.

$$E = \Delta P.R \times \left[\frac{\Delta P.T}{|\Delta P.T|}\right]^\wedge \qquad \text{Equation (11)}$$

where R and T are the rotation and translation components of the transform and the $[\ ]^\wedge$ operator in Equation (11) denotes the mapping from the unit vector to the skew symmetric matrix.

$$H^r = K_c^{-1} \times p_r^c \qquad \text{Equation (12)}$$

where $H^r$ is a matrix that describes a 3D camera ray from the camera through the pixel $p_r^c$.

$$H^s = K_d^{-1} \times p_s^d \qquad \text{Equation (13)}$$

where $H^s$ is a matrix that describes a 3D camera ray from the camera through the pixel $p_s^d$.

$$H^{rT} \times E \times H^s = 0 \qquad \text{Equation (14)}$$

Equation (14) defines the Epipolar constraint. Since the extrinsic matrix $T_c$ of the camera_c can be determined using the techniques described in Section V of this patent document, the calibration module can adjust the extrinsic matrix $T_d$ of the camera_d such that the matrix multiplication shown in Equation (14) equals zero.

VII. Asynchronous 2D-2D Factor for the Factor Graph

In some embodiments, the calibration module can determine whether an asynchronous 2D-2D image-to-image factor can be applied for two cameras that are pre-determined to have overlapping or non-overlapping field of views. For example, for the example camera setup in FIG. 1, the calibration module can apply an asynchronous 2D-2D image-to-image factor to images obtained by cameras 102a and 102g, or 102c and 102f, etc., In some embodiments, the calibration module can apply an asynchronous 2D-2D image-to-image factor to apply a constraint between a pair of cameras having overlapping or non-overlapping field of views for images captured at different times. The calibration module can apply the asynchronous 2D-2D factor when the calibration module determines that a same block is included in two images obtained by two cameras at, for example, two different times. The calibration module can also compute the essential matrix constraint, but because the calibration module applies to asynchronous cameras, the constraint is applied between 16 total variables: the same four above (i.e., $T_c$, $K_c$, $T_d$, $K_d$) plus four sets of $X_t$, $V_t$, $\omega_t$. Four sets $X_t$, $V_t$, $\omega_t$ are used by the calibration module to describe the asynchronous 2D-2D factor, where the calibration module uses two sets used to interpolate the first camera pose and two sets to interpolate the second camera pose. For an image captured by a camera at time t=m, between states t=j and t=k, the IMU sensor pose $X_m$ is interpolated from $X_j$, $V_j$, $\omega_j$ and $X_k$, $V_k$, $\omega_k$. For two such IMU sensor poses $X_m$ and $X_n$ (for another image from another camera captured at time t=n), the only change in the constraint is shown in Equation (15):

$$\Delta P = T_c^{-1} \oplus (X_m \ominus X_n) \oplus T_d \qquad \text{Equation (15)}$$

The calibration module can apply ΔP from Equation (15) into Equations (11) to (14) to optimize (or adjust) the extrinsic matrices of camera_c and/or camera_d at the same time by minimizing the error function described in Equations (11) to (14). In some embodiments, if the calibration module determines that the extrinsic matrix of camera_c has been optimized (e.g., by using the techniques described in Section V or VI), then the calibration module can minimize the error function described in Equations (10) to (14) by adjusting the extrinsic matrix of camera_d.

VIII. Image-3D Factor for the Factor Graph

In some embodiments, the calibration module can also apply an image-to-3D factor to a camera. The image-to-3D factor replaces an exact 2D correspondence to a lane block with an image mask of lane markings. The distance transform between a re-projected point and the mask defines the error.

In some embodiments, the calibration module can include a general lane mark constraint between a whole image and a map. This technique enables the formation of constraints to solid lines, in addition to dashed ones. For each solid lane, the HD-map includes 3D world coordinates at an interval. For each dashed lane, the 3D world coordinates are the locations (e.g., corners) of the lane dashes, as previously specified. The calibration module projects a map point of a location of a solid line or dashed line to a region of the image with a lane marking detected from the image. The calibration module forms a constraint from a map point to an image by first applying image processing to the image. Lane marks are found in the camera image with image processing. The result is a binary image that indicates which pixels are lane marks and which are not. The calibration module projects the map point according to Equation (8), which can fall within a lane mark of the image mask and can provide an expected pixel location p" of the lane mark. Given an expected pixel location p" as defined in Equation (8), the calibration module determines a nearest pixel (lm) of a lane marker in the image obtained by the camera. The calibration module applies the constraint as defined in Equation (16) to adjust the extrinsic matrix of the camera (e.g., using Equation (8)) to minimize the difference between the expected pixel location and the determined nearest pixel of the lane marker (lm):

$$\|p'' - lm\|_2 = 0 \qquad \text{Equation (16)}$$

Figure 3:
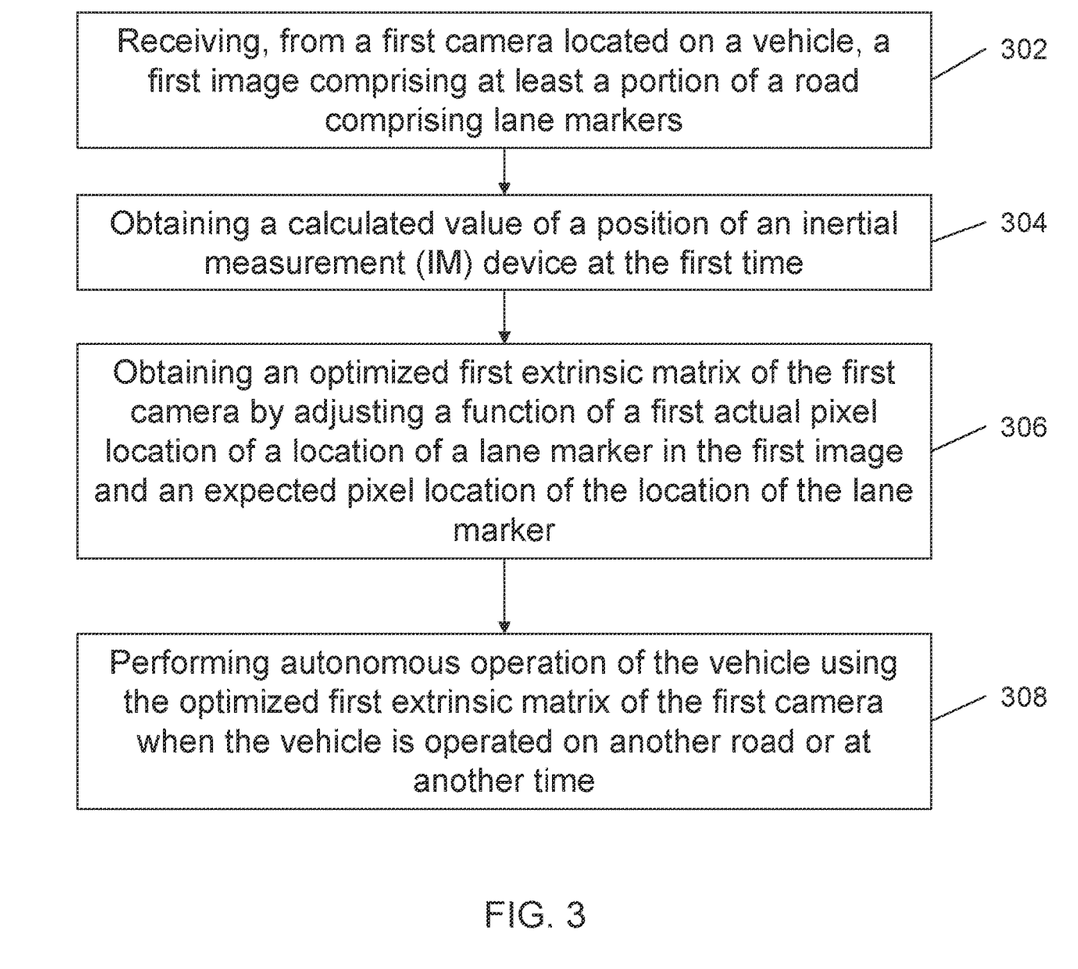
FIG. 3 shows an example flow diagram of performing multi-sensor sequential calibration.

FIG. 3 shows an example flow diagram of performing a sensor sequential calibration. Operation 302 includes a calibration module receiving, from a first camera located on a vehicle, a first image comprising at least a portion of a road comprising lane markers, where the first image is obtained by the camera at a first time. Operation 304 includes the calibration module obtaining a calculated value of a position of an inertial measurement (IM) device at the first time. Operation 306 includes the calibration module obtaining an optimized first extrinsic matrix of the first camera by adjusting a function of a first actual pixel location of a location of a lane marker in the first image and an expected pixel location of the location of the lane marker, where the expected pixel location is based at least on a previously known first extrinsic matrix of the first camera and the position of the IM device. Operation 308 includes an autonomous operation module performing autonomous operation of the vehicle using the optimized first extrinsic matrix of the first camera when the vehicle is operated on another road or at another time.

In some embodiments, the method of FIG. 3, further comprises receiving, from a second camera located on the vehicle, a second image comprising at least a second portion of the road, where the second portion at least partially overlaps with the portion obtained by the first image received from the first camera; in response to determining that the second image comprises the lane marker that is same as the lane marker in the first image: determining, from the second image, a second actual pixel location of the location of the lane marker; determining, based at least on the first actual pixel location, a first matrix that describes a first three-dimensional (3D) camera ray from the first camera to the location of the lane marker; determining based at least on the second actual pixel location, a second matrix that describes a second 3D camera ray from the second camera to the location of the lane marker; and obtaining an optimized second extrinsic matrix of the second camera by adjusting a previously known second extrinsic matrix of the second camera based on a matrix multiplication of the first matrix, the second matrix, and an essential matrix that describes a relationship of the first actual pixel location and the second actual pixel location.

In some embodiments, the previously known second extrinsic matrix of the second camera is adjusted so that the matrix multiplication is equal to zero. In some embodiments, the second image is obtained by the second camera at the first time. In some embodiments, the essential matrix is based at least on the optimized first extrinsic matrix and the second extrinsic matrix. In some embodiments, identities of the first camera and the second camera that have at least some overlapping field of view is previously known. In some embodiments, the first matrix for the first 3D camera ray is determined by multiplying an inverse of a first intrinsic matrix of the first camera with the first actual pixel location, and the second matrix for the second 3D camera ray is determined by multiplying an inverse of a second intrinsic matrix of the second camera with the second actual pixel location.

In some embodiments, a system for calibration of one or more sensors on or in a vehicle is described, where the system comprising a processor configured to perform the operations described at least in FIG. 3 and in this patent document. In some embodiments, the adjusting the function of the first actual pixel location and the expected pixel location comprises minimizing a difference between the first actual pixel location and the expected pixel location to zero by adjusting the first extrinsic matrix of the first camera. In some embodiments, the calculated value of the position of the IM device is obtained based at least on location measurements provided by a global positioning system (GPS) device on the vehicle for a second time and for a third time as the vehicle is driven on the road, the first time is in between the second time and the third time, and the measurement provided by the GPS device at the third time is immediately adjacent to that provided by the GPS device at the second time.

In some embodiments, the calculated value of the position of the IM device at the first time is based on: a first location provided by the GPS device for the second time, a second location provided by the GPS device at the third time, and a previously known location of the IM device relative to that of the GPS device. In some embodiments, the calculated value of the position of the IM device is an interpolated value in between a second position of the IM device at the second time and a third position of the IM device at the third time, the second position of the IM device is based on the second location provided by the GPS device and the previously known location of the IM device relative to that of the GPS device, and the third position of the IM device is based on the third location provided by the GPS device and the previously known location of the IM device relative to that of the GPS device.

In some embodiments, a non-transitory computer readable storage medium having code stored thereon, the code, when executed by a processor, causing the processor to implement a method disclosed at least in FIG. 3 and/or in this patent document. In some embodiments, the expected pixel location is based on a first intrinsic matrix of the first camera, the position of the IM device, the previously known first extrinsic matrix of the first camera, and three-dimensional (3D) world coordinates of the location of the lane marker. In some embodiments, the location of the lane marker includes a corner of the lane marker. In some embodiments, the method of FIG. 3 further comprises receiving, from a third camera located on the vehicle, a third image comprising at least a third portion of the road, where the third image is obtained by the third camera at a time that is different from the first time; in response to determining that the third image comprises the lane marker that is same as the lane marker in the first image: determining, from the third image, a third actual pixel location of the location of the lane marker; determining, based at least on the first actual pixel location, a first matrix that describes a first three-dimensional (3D) camera ray from the first camera to the location of the lane marker; determining based at least on the third actual pixel location, a third matrix that describes a third 3D camera ray from the third camera to the location of the lane marker; and obtaining an optimized third extrinsic matrix of the third camera by adjusting a previously known third extrinsic matrix of the third camera or by adjusting the optimized first extrinsic matrix of the first camera using at least the first matrix and a second matrix.

In some embodiments, the adjusting of the previously known third extrinsic matrix of the third camera or the optimized first extrinsic matrix of the first camera is based on a matrix multiplication of the first matrix, the second matrix, and an essential matrix so that the matrix multiplication is equal to zero, and the essential matrix describes a relationship of the first actual pixel location and the third actual pixel location. In some embodiments, the essential matrix is based at least on a second position of the IM device when the third image is obtained by the third camera, the position of the IM device when the first image is obtained by the first camera, the optimized first extrinsic matrix, and the third extrinsic matrix. In some embodiments, the first camera has a field of view that at least partially overlaps with that of the third camera.

In some embodiments, the method of FIG. 3 further comprises receiving, from a fourth camera located on the vehicle, a fourth image comprising at least a fourth portion of the road; determining a fourth actual pixel location of a first location of a first lane marker in the fourth image; applying an image mask comprising a second lane marker to the fourth image; determining an expected pixel location of a second location of the second lane marker; and obtaining an optimized fourth extrinsic matrix of the fourth camera by adjusting a previously known fourth extrinsic matrix of the fourth camera so that a difference between the fourth actual pixel location and the expected pixel location of the second location of the second lane marker is minimized.

FIG. 4 shows an example block diagram of a computer that may be located in a vehicle to perform multi-sensor sequential calibration processes described in some embodiments. The computer 400 includes at least one processor 410 and a memory 405 having instructions stored thereupon. The instructions upon execution by the processor 410 configure the computer 400 to perform the operations described for the multiple sensors and various modules (e.g., calibration module 420 and/or autonomous operation module 425) as described in FIGS. 1 to 3 and 5 to 6, and/or the operations described in the various embodiments.

The autonomous operation module 425 can receive sensor data (e.g., images, PCD, radar data) of an environment in which the autonomous vehicle is operating, where the sensor data is obtained from the multiple sensors onboard the vehicle. The autonomous operation module 425 can instruct the autonomous vehicle to operate on a road (e.g., determine distance to vehicles in front of the autonomous vehicle, turn, apply brakes) based on the sensor data and based on the sensor data adjusted using the optimized extrinsic matrix obtained from the calibration module. In an example implementation, the autonomous operation module can determine a location of an object located in front of or next to or behind the autonomous vehicle based on a presence of the object on an image obtained by a camera onboard the autonomous vehicle and based on the optimized extrinsic matrix of the camera.

This patent document describes example sequential techniques for performing extrinsic camera calibration of a multi-sensor equipped vehicle. The calibration module in this patent document can use an IMU, a GPS, and an HD map of 3D lane markers to resolve the pose transforms between cameras and the IMU. Image processing techniques can be applied by the calibration module to register views of map points, views of lane lines, and/or shared views of map points between images obtained by different cameras. Shared views include any image pair of cameras that shares an overlapping field of view, whether the images were acquired at the same time or at different times, whether the cameras are of the same type or not, or whether the lenses have the same focal length or not. Constraints between shared views can maximize the agreement of the extrinsic calibration to Epipolar geometry, which can be better than HD map-only calibration due to the fact that map points may have errors. Non-linear optimization that may be performed by the calibration module on the constraints obtained from the IMU, the GPS, and the results of image process can render the pose transforms. The example multi-sensor sequential calibration methods can yield precise extrinsic calibration of multi-view, standard, wide-angle, and telephoto lens cameras with perception up to 1000 m, for an automotive application.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A method of calibrating one or more sensors for an autonomous vehicle, comprising:

receiving, from a first camera located on a vehicle, a first image comprising at least a portion of a road comprising lane markers, wherein the first image is obtained by the first camera at a first time;

obtaining a calculated value of a position of an inertial measurement (IM) device at the first time;

obtaining an optimized first extrinsic matrix of the first camera by adjusting a function of a first actual pixel location of a location of a lane marker in the first image and an expected pixel location of the location of the lane marker, wherein the expected pixel location is based at least on a previously known first extrinsic matrix of the first camera and the position of the IM device;

performing autonomous operation of the vehicle using the optimized first extrinsic matrix of the first camera when the vehicle is operated on another road or at another time;

receiving, from a second camera located on the vehicle, a second image comprising at least a second portion of the road, wherein the second portion at least partially overlaps with the portion obtained by the first image received from the first camera;

in response to determining that the second image comprises the lane marker that is same as the lane marker in the first image:

determining, from the second image, a second actual pixel location of the location of the lane marker;

determining, based at least on the first actual pixel location, a first matrix that describes a first three-dimensional (3D) camera ray from the first camera to the location of the lane marker; and     determining based at least on the second actual pixel location, a second matrix that describes a second 3D camera ray from the second camera to the location of the lane marker; and obtaining an optimized second extrinsic matrix of the second camera by adjusting a previously known second extrinsic matrix of the second camera based on a matrix multiplication of the first matrix, the second matrix, and an essential matrix that describes a relationship of the first actual pixel location and the second actual pixel location.

2. The method of claim 1, wherein the first matrix for the first 3D camera ray is determined by multiplying an inverse of a first intrinsic matrix of the first camera with the first actual pixel location, and wherein the second matrix for the second 3D camera ray is determined by multiplying an inverse of a second intrinsic matrix of the second camera with the second actual pixel location.

3. The method of claim 1, wherein the previously known second extrinsic matrix of the second camera is adjusted so that the matrix multiplication is equal to zero.

4. The method of claim 1, wherein the second image is obtained by the second camera at the first time.

5. The method of claim 1, wherein the essential matrix is based at least on the optimized first extrinsic matrix.

6. The method of claim 1, wherein identities of the first camera and the second camera that have at least some overlapping field of view is previously known.

7. A system for calibration of one or more sensors on or in a vehicle, the system comprising a processor configured to:

receive, from a first camera located on the vehicle, a first image comprising at least a portion of a road comprising lane markers, wherein the first image is obtained by the first camera at a first time;

obtain a calculated value of a position of an inertial measurement (IM) device at the first time;

obtain an optimized first extrinsic matrix of the first camera by adjusting a function of a first actual pixel location of a location of a lane marker in the first image and an expected pixel location of the location of the lane marker, wherein the expected pixel location is based on a previously known first extrinsic matrix of the first camera and the position of the IM device;

perform autonomous operation of the vehicle using the optimized first extrinsic matrix of the first camera when the vehicle is operated on another road or at another time;

receive, from a second camera located on the vehicle, a second image comprising at least a second portion of the road, wherein the second portion at least partially overlaps with the portion obtained by the first image received from the first camera;

in response to a determination that the second image comprises the lane marker that is same as the lane marker in the first image:

determine, from the second image, a second actual pixel location of the location of the lane marker;

determine, based at least on the first actual pixel location, a first matrix that describes a first three-dimensional (3D) camera ray from the first camera to the location of the lane marker; and         determine based at least on the second actual pixel location, a second matrix that describes a second 3D camera ray from the second camera to the location of the lane marker; and     obtain an optimized second extrinsic matrix of the second camera by adjusting a previously known second extrinsic matrix of the second camera based on a matrix multiplication of the first matrix, the second matrix, and an essential matrix that describes a relationship of the first actual pixel location and the second actual pixel location.

8. The system of claim 7, wherein the essential matrix is based at least on the optimized first extrinsic matrix.

9. The system of claim 7, wherein the adjusting the function of the first actual pixel location and the expected pixel location is performed by the processor configured to minimize a difference between the first actual pixel location and the expected pixel location to zero by adjusting the previously known first extrinsic matrix of the first camera.

10. The system of claim 7, wherein the calculated value of the position of the IM device is obtained based at least on location measurements provided by a global positioning system (GPS) device on the vehicle for a second time and for a third time as the vehicle is driven on the road, wherein the first time is in between the second time and the third time, and wherein a measurement provided by the GPS device at the third time is immediately adjacent to that provided by the GPS device at the second time.

11. The system of claim 10, wherein the calculated value of the position of the IM device at the first time is based on:

a first location provided by the GPS device for the second time,     a second location provided by the GPS device at the third time, and     a previously known location of the IM device relative to that of the GPS device.

12. The system of claim 11, wherein the calculated value of the position of the IM device is an interpolated value in between a second position of the IM device at the second time and a third position of the IM device at the third time, wherein the second position of the IM device is based on the second location provided by the GPS device and the previously known location of the IM device relative to that of the GPS device, and wherein the third position of the IM device is based on the third location provided by the GPS device and the previously known location of the IM device relative to that of the GPS device.

13. A non-transitory computer readable storage medium having code stored thereon, the code, when executed by a processor, causing the processor to implement a method comprising:
   receiving, from a first camera located on a vehicle, a first image comprising at least a portion of a road comprising lane markers, wherein the first image is obtained by the first camera at a first time;
   obtaining a calculated value of a position of an inertial measurement (IM) device at the first time;
   obtaining an optimized first extrinsic matrix of the first camera by adjusting a function of a first actual pixel location of a location of a lane marker in the first image and an expected pixel location of the location of the lane marker, wherein the expected pixel location is based at least on a previously known first extrinsic matrix of the first camera and the position of the IM device;
   performing autonomous operation of the vehicle using the optimized first extrinsic matrix of the first camera when the vehicle is operated on another road or at another time;
   receiving, from a second camera located on the vehicle, a second image comprising at least a second portion of the road, wherein the second portion at least partially overlaps with the portion obtained by the first image received from the first camera;
   in response to determining that the second image comprises the lane marker that is same as the lane marker in the first image:
      determining, from the second image, a second actual pixel location of the location of the lane marker;
      determining, based at least on the first actual pixel location, a first matrix that describes a first three-dimensional (3D) camera ray from the first camera to the location of the lane marker; and
      determining based at least on the second actual pixel location, a second matrix that describes a second 3D camera ray from the second camera to the location of the lane marker; and
   obtaining an optimized second extrinsic matrix of the second camera by adjusting a previously known second extrinsic matrix of the second camera based on a matrix multiplication of the first matrix, the second matrix, and an essential matrix that describes a relationship of the first actual pixel location and the second actual pixel location.

14. The non-transitory computer readable storage medium of claim 13, wherein the expected pixel location is based on a first intrinsic matrix of the first camera, the position of the IM device, the previously known first extrinsic matrix of the first camera, and three-dimensional (3D) world coordinates of the location of the lane marker.

15. The non-transitory computer readable storage medium of claim 13, wherein the location of the lane marker includes a corner of the lane marker.

16. The non-transitory computer readable storage medium of claim 13, further comprising:
   receiving, from a third camera located on the vehicle, a third image comprising at least a third portion of the road, wherein the third image is obtained by the third camera at a time that is different from the first time;
   in response to determining that the third image comprises the lane marker that is same as the lane marker in the first image:
      determining, from the third image, a third actual pixel location of the location of the lane marker;
      determining based at least on the third actual pixel location, a third matrix that describes a third 3D camera ray from the third camera to the location of the lane marker; and
      obtaining an optimized third extrinsic matrix of the third camera by adjusting a previously known third extrinsic matrix of the third camera or by adjusting the optimized first extrinsic matrix of the first camera using at least the first matrix and a second matrix.

17. The non-transitory computer readable storage medium of claim 16,
   wherein the adjusting of the previously known third extrinsic matrix of the third camera or the optimized first extrinsic matrix of the first camera is based on a matrix multiplication of the first matrix, the second matrix, and an essential matrix so that the matrix multiplication is equal to zero, and
   wherein the essential matrix describes a relationship of the first actual pixel location and the third actual pixel location.

18. The non-transitory computer readable storage medium of claim 17, wherein the essential matrix is based at least on a second position of the IM device when the third image is obtained by the third camera, the position of the IM device when the first image is obtained by the first camera, the optimized first extrinsic matrix, and the previously known third extrinsic matrix.

19. The non-transitory computer readable storage medium of claim 16, wherein the first camera has a field of view that at least partially overlaps with that of the third camera.

20. The non-transitory computer readable storage medium of claim 13, further comprising:
   receiving, from a fourth camera located on the vehicle, a fourth image comprising at least a fourth portion of the road;
   determining a fourth actual pixel location of a first location of a first lane marker in the fourth image;
   applying an image mask comprising a second lane marker to the fourth image;
   determining an expected pixel location of a second location of the second lane marker; and
   obtaining an optimized fourth extrinsic matrix of the fourth camera by adjusting a previously known fourth extrinsic matrix of the fourth camera so that a difference between the fourth actual pixel location and the expected pixel location of the second location of the second lane marker is minimized.

* * * * *

UNITED STATES PATENT AND TRADEMARK OFFICE
CERTIFICATE OF CORRECTION

| | | |
|---|---|---|
| PATENT NO. | : 11,702,089 B2 | Page 1 of 1 |
| APPLICATION NO. | : 17/150271 | |
| DATED | : July 18, 2023 | |
| INVENTOR(S) | : Shane David Griffith et al. | |

It is certified that error appears in the above-identified patent and that said Letters Patent is hereby corrected as shown below:

In the Specification

In Column 5, Line 13, delete "$\mathbb{R}^3$." and insert -- $\mathbb{R}^6$. --, therefor.

In Column 5, Line 38, delete "$\mathbb{R}^3$ vector," and insert -- $\mathbb{R}^6$ vector, --, therefor.

In Column 6, Line 40, delete "$\frac{1}{2}\sum_{k=i}^{j-1}\hat{a}_i \Delta t^2$" and insert -- $\frac{1}{2}\sum_{k=i}^{j-1}\hat{a}_t \Delta t^2$ --, therefor.

Signed and Sealed this
Nineteenth Day of September, 2023

Katherine Kelly Vidal
*Director of the United States Patent and Trademark Office*